United States Patent [19]

Hisagen et al.

[11] 4,047,232
[45] Sept. 6, 1977

[54] LEADER TAPE

[75] Inventors: Yoshiaki Hisagen, Sendai; Kazuo Hoshi, Iwanuma, both of Japan

[73] Assignee: Sony Corporation, Tokyo, Japan

[21] Appl. No.: 619,923

[22] Filed: Oct. 6, 1975

Related U.S. Application Data

[63] Continuation of Ser. No. 244,421, April 17, 1972, abandoned.

[30] Foreign Application Priority Data

Apr. 20, 1971 Japan ................................. 46-25468

[51] Int. Cl.$^2$ ............................................. G11B 5/78
[52] U.S. Cl. ................................... 360/134; 428/480; 428/539; 428/900
[58] Field of Search ............... 428/454, 480, 538, 539, 428/DIG. 900; 274/41.4, 43; 96/87 A; 427/48, 130, 128, 129, 131, 132; 360/134

[56] References Cited

U.S. PATENT DOCUMENTS

| | | | |
|---|---|---|---|
| 2,875,098 | 2/1959 | Blatz | 428/539 |
| 3,212,890 | 10/1965 | Kimble et al. | 96/1.8 |
| 3,574,674 | 4/1971 | Taylor | 428/538 |
| 3,622,420 | 11/1971 | Knox | 274/43 |
| 3,656,996 | 4/1972 | Paesschen et al. | 428/480 |
| 3,729,203 | 4/1973 | Kinard | 274/41.4 |

*Primary Examiner*—Charles E. Van Horn
*Assistant Examiner*—Jerome W. Massie
*Attorney, Agent, or Firm*—Hill, Gross, Simpson, Van Santen, Steadman, Chiara & Simpson

[57] ABSTRACT

A leader tape for a magnetic recording tape having a coating layer consisting of a binder and a white pigment. A surface resistivity of the coating layer is less than $10^{12}$ ohms/sq. and a transmissivity of the leader tape is more than 20 percent.

5 Claims, 2 Drawing Figures

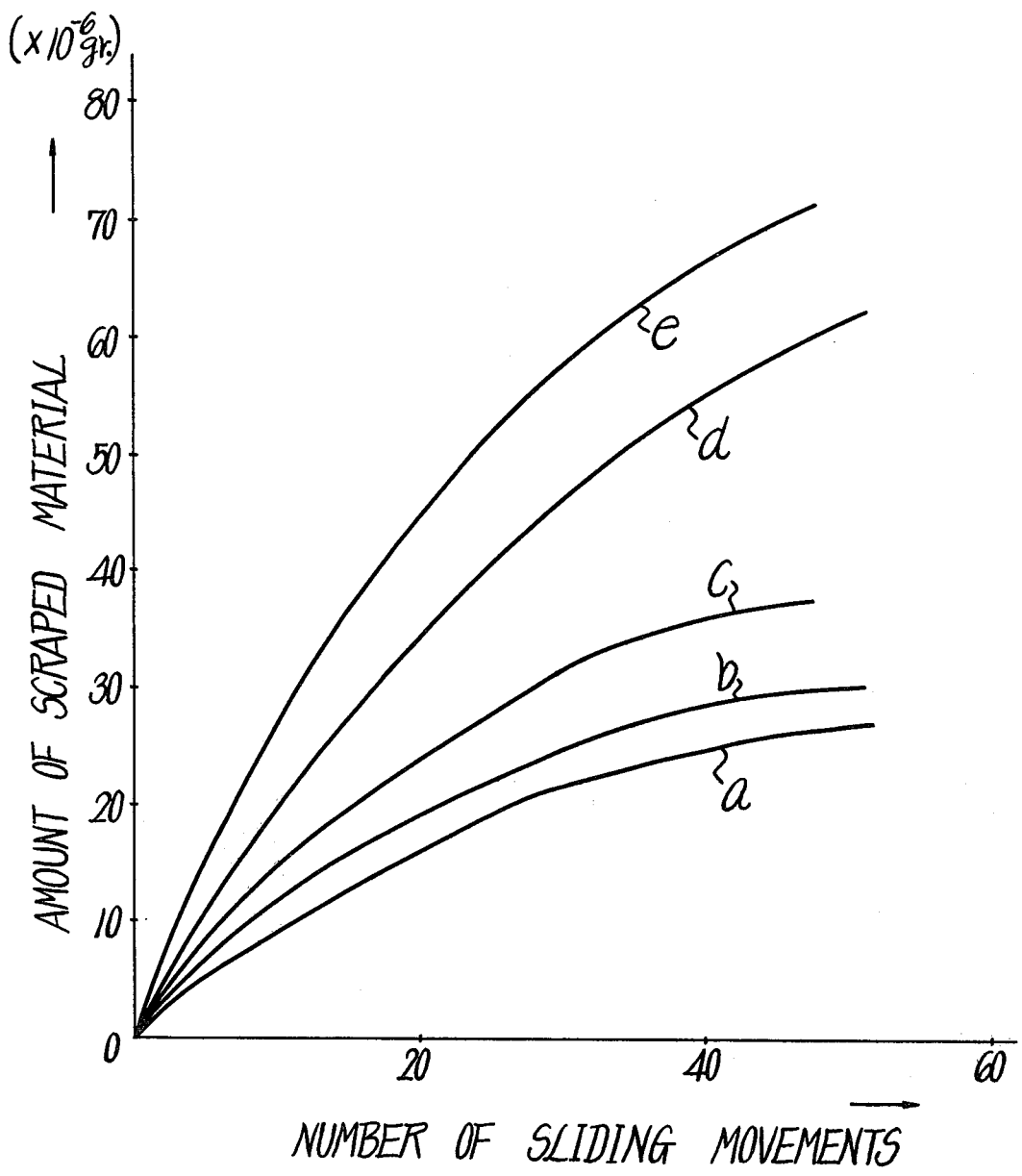

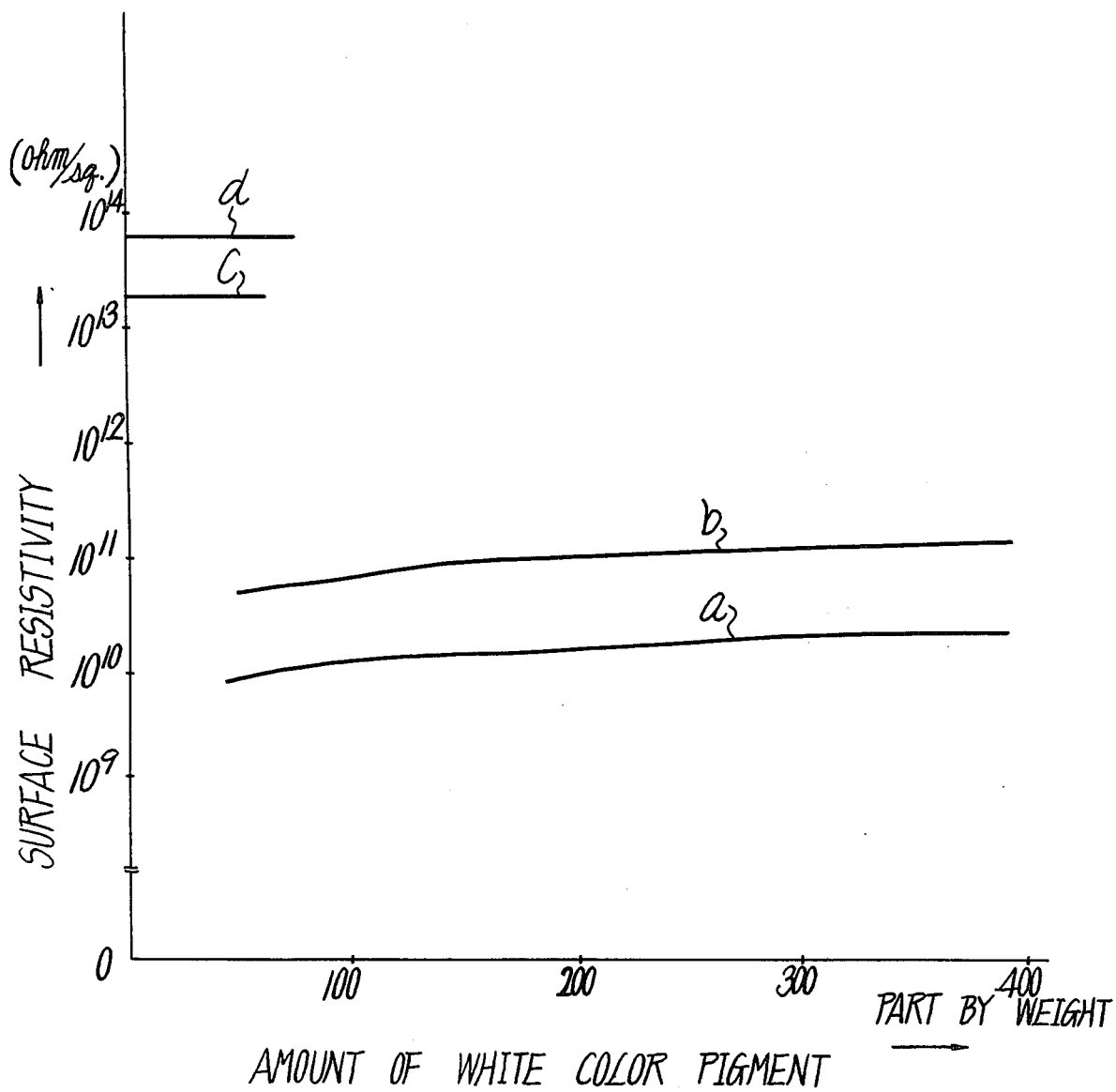

LEADER TAPE

This is a continuation of application Ser. No. 244,421, filed Apr. 17, 1972, now abandoned.

BACKGROUND OF THE INVENTION

1. Field of the Invention

This relates to a leader tape for a magnetic recording tape and more particularly to a leader tape having a coating layer for increasing a wear resistance thereof.

2. Description of the Prior Art

A conventional magnetic tape has a nonmagnetic tape secured to one end thereof, for example, a so-called leader tape with no magnetic coating thereon. When such a conventional magnetic tape with a leader tape is used in a video tape recorder, the leader tape is scanned by a rotary magnetic head and scraped thereby with the tendency that material or substance is scraped from the leader tape and thus scraped material or substance clogs the magnetic head or adheres on a magnetic coating layer of the magnetic tape. In a video tape recorder, since a magnetic tape is used under high tape tension and a relative velocity between a magnetic head and a magnetic tape is high to heat contact areas of the magnetic head with the magnetic tape, the phenomenon mention above likely occurs. Accordingly, when a video tape recorder uses a conventional magnetic tape with a leader tape, there may occur the cases that recording and/or reproducing operations can not be carried out and that drop-out phenomena occur in the reproduced signals.

There has been proposed a tape cassette in which one or two reel hubs are provided to which an end portion of a leader tape is secured. With such a tape cassette, the leader tape must be made transparent for detecting an end of the magnetic tape. Accordingly, in such a tape cassette the leader tape can not be dispensed with, so that a transparent tape made of vinylchloride, polyethylene terephthalate or the like must be employed as a leader tape. For this reason, a conventional magnetic tape with a leader tape has only the drawback described above but also other drawbacks that discharge is generated due to electrification of the leader tape and foreign substance may adhere to the tape due to the same reason. Such drawbacks present problem in view of practical use.

SUMMARY OF THE INVENTION

Accordingly, it is an object of the present invention to provide a leader tape which consists of a nonmagnetic base and a coating layer formed thereon which coating layer shows high wear resistance, high transmissivity and low surface resistivity to avoid the drawbacks encountered in the prior art as described above.

It is another object of the present invention to provide a leader tape which is preferable when used in a tape cassette such, for example, as disclosed in the U.S. Pat. application Ser. No. 170,214 filed Aug. 9, 1971 and assigned to the same assignee of the present application.

BRIEF DESCRIPTION OF THE DRAWING

FIGS. 1 and 2 are respectively graphs used for explaining the present invention.

DESCRIPTION OF THE PREFERRED EMBODIMENT

According to the present invention, a leader tape has a coating layer consisting of binder and light color pigment and formed on a surface of a transparent or semi-transparent nonmagnetic base. White or light color pigment, which is one or two materials selected from zinc oxide, titanium oxide, calcium carbonate, zinc sulfide, silicon monoxide, antimony oxide, white lead, aluminum oxide, barium sulfate, lead sulfate, talc, clay, lithopone, white carbon black, tin oxide and so on, is verified to be suited as the light color pigment for increasing wear resistance without so decreasing transmissivity of the coating layer. After measuring a transmissivity of a coating layer by varying amount of a light color pigment with respect to that of a binder, it is found that when amount of the light color pigment is increased over 400 parts by weight for 100 parts by weight of a binder, the transmissivity of thus obtained coating layer becomes less than 20 percent, which is resulted in that an end of a magnetic tape can not be detected to cause an error operation and its adhesion power to a nonmagnetic base is deteriorated. On the other hand, it is found that when amount of the light color pigment becomes less than 50 parts by weight for the same amount of the binder, the wear resistance is decreased. Accordingly, it is realized that at any case leader tapes thus formed can not be practically used. For this reason, it is preferred that the amount of the light color pigment is selected from 50 to 400 parts by weight for 100 parts by weight of the binder.

The transmissivity of the coating layer is measured by a photoelectric spectrophotometes with homogeneous light of 725 millimicrons in wave length.

A surface conductivity of a conventional leader tape made of vinylchloride or polyethylene terephthalate is respectively $8 \times 10^{14}$ ohms/sq. and $2 \times 10^{14}$ ohms/sq. and then its electrification causes problem in fact. However, when a coating layer is made of material including 50 parts by weight of a pigment, its surface conductivity becomes less then $10^{12}$ ohms/sq. to eliminate the problem of electrification. In this case, it is also found that more than 100 parts by weight of the pigment is more preferred to be added to the material of the coating layer. The reason is that the binder is given with antistatic effect and the resistivity of the pigment itself is low as compared with that of polyethylene terephthalate.

As to thickness of the coating layer, if a material with 400 parts by weight of pigment is employed as a coating layer, the coating layer becomes brittle to decrease its mechanical strength. As a result, it is found that material with less than 300 parts by weight of pigment is preferred to be employed as the coating layer.

The present invention will be hereinbelow described in detail in accordance with practical embodiments.

EXAMPLE I

Mixture or coating material of the following composition is coated on a polyethylene terephthalate film with 0.15 millimeters in thickness as a coating layer up to 4 microns.

Composition of Mixture or Coating Material

| | |
|---|---|
| Cation acryl polymer (PQ-20; Trade Name) | 20 parts by weight |
| Methoxy methyl nylon (Toresin F-30; Trade Name) | 80 parts by weight |
| Active zinc oxide | 200 parts by weight |
| Citric acid | 1.5 parts by weight |
| Methyl alcohol | 300 parts by weight |

The cation acryl polymer (PQ-20) used in the mixtue has an antistatic effect and serves together with the methoxy methyl nylon as a binder. In the mixture, the citric acid is a cross-linking agent while the methyl alcohol is a solvent.

After drying the polyethylene terephthalate film on which the coating layer of the above composition is formed, the coating layer is subjected to calender treatment. Thus obtained film is split with desired width and length to provide a leader tape.

The surface resistivity of thus manufactured leader tape is approximately $10^{10}$ ohms/sq. which is a value measured under such a condition that a leader tape with about 30cm. in length and ½ inch in width is disposed between a pair of electrodes with chromium plated thereon, fixed on the pair of electrodes by means of weights at both ends of the leader tape, thereafter a voltage is supplied across the pair of electrodes to measure current flowing through the leader tape and the surface resistivity of the leader tape is obtained based upon thus measure current.

While, the wear resistance characteristic of the leader tape can be measured by, for example, such a manner that weight of a leader tape with 20cm. in length and ½ inch in width is firstly measured, the leader taped is placed on an abrasive tape with the coated surface of the leader tape being in contact with the abrasive tape, the leader tape with weight attached to its one end is slided on the abrasive tape by predetermined numbers, then weight of the worn leader tape is measured and the wear resistance characteristic of the leader tape is thus obtained by measuring the weight difference before the after the sliding movement of the leader tape on the abrasive tape or weight of the material scraped off from the leader tape.

FIG. 1 is a graph showing relationships between a number of sliding movements of a leader tape on an abrasive tape and amount of material scraped off from the leader tape by the abrasive tape during the sliding movements, in which the abscissa represents the number of the sliding movements of a leader tape on a abrasive tape and the ordinate amount of scraped material from a leader tape in $10^{-6}$ gr.

In the graph of FIG. 1, a curve $a$ is the case of the leader tape of this invention mentioned above, a curve $d$ is a case of a conventional leader tape the base of which is made of vinyl chloride with no coating layer, and a curve $e$ a case of a leader tape the base of which is made of polyethylene terephthalate with no coating layer.

The transmissivity of such a leader tape of this example is 30 percent.

EXAMPLE II

Mixture or coating material, the composition of which is entirely same to that of the Example I but the amount of the active zinc oxide serving as white color pigment of which is gradually increased from 30 parts by weight, is coated on a polyethylene terephthalate film with 0.15 millimeters in thickness up to 4 microns. Thus manufactured leader tape has a surface resistivity characteristic versus amount of the white color pigment shown by a curve $a$ FIG. 2 in which the abscissa represents the amount of the white color pigment in part by weight and the ordinate the surface resistivity in ohm/sq. Further, it is ascertained that the leader tape of this example has wear resistance characteristic approximately same to that of the leader tape of the Example I and transmissivities of 75, 30 and 25 percent respectively when the amounts of the white color pigment (active zinc oxide) are respectively 30, 200 and 400 parts by weight.

EXAMPLE III

Mixture or coating material of the following composition is coated on a polyethylene terephthalate film up to 3 microns in thickness to provide sample leader tapes similar to that of the Example I.

Composition of Mixture or Coating Material

| | |
|---|---|
| Acryl resin (PQ-250; Trade Name) | 30 parts by weight |
| Vinyl chloride-Vinyl acetate copolymer (VYHH; Trade Name) | 70 parts by weight |
| Calcium chloride (Antistatic agent) | 2 parts by weight |
| Titanium oxide | 50~400 parts by weight |
| Dimethyl Formamide | 300 parts by weight |

Thus manufactured leader tapes have a surface resistivity ranged between $10^{10}$ and $10^{11}$ ohms/sq. as shown by a curve $b$ in FIG. 2 and a wear resistance characteristic shown by a curve $b$ in FIG. 1 when the amount of the titanium oxide (white color pigment) is 250 parts by weight. Meanwhile, the leader tapes of this example have transmissivities of 50, 25, 23 and 20 percent respectively when the amounts of titanium oxide are respectively 30, 200, 250 and 300 parts by weight.

EXAMPLE IV

Mixture or coating material of the following composition is coated on a film similar to that of the Example I to provide sample leader tapes.

Composition of Mixture or Coating Material

| | |
|---|---|
| Acryl resin (PQ-10; Trade Name) | 30 parts by weight |
| Polyvinyl alcohol | 70 parts by weight |
| Calcium chloride | 2 parts by weight |
| Water | 100 parts by weight |
| Calcium carbonate | 150 parts by weight |
| Methyl alcohol | 200 parts by weight |

In this mixture, the acryl resin and polyvinyl alcohol serve as a binding agent.

Thus obtained leader tapes have a surface resistivity of $10^9$ ohms/sq., a transmissivity of 30 percent and a wear resistance characteristic shown by a curve $c$ in FIG. 1.

It will be understood that the leader tapes, consisting of polyethylene terephthalate bases or films and coating layers formed of mixtures or coating materials with the compositions described in connection with the Examples I to IV, are much improved in surface resistivity and wear resistance as compared with a conventional leader tape made of polyethylene terephthalate film with no coating layer.

As apparent from the graph of FIG. 1, the leader tape according to the invention is increased in wear resistance characteristic as compared with conventional leader tapes by 2 to 3 times, which will means that when the leader tape of the invention is contact with a rotary magnetic head of video tape recorder, the coating material on the leader tape is less scraped off therefrom by the head as compared with the prior art with a result that occurrence of so-called head clogging and/or drop-out can be positively prevented.

Further, since the leader tape of the invention has surface resistivity less than $10^{11}$ ohms/sq. as apparent from FIG. 2, electrostatic charges are not so easily generated when the leader tape slides on a tape guide drum of a video tape recorder to avoid adherence of dusts and the like to the leader tape with a result that no drop-out occurs.

Polyester has a surface resistivity of about $10^{13}$ ohms/sq. as shown by a curve $c$ in FIG. 2 and vinyl chloride has a surface resistivity of about $10^{14}$ ohms/sq. as shown by a curve $d$ in FIG. 2, so that a conventional leader tape with its base made or polyethylene terephthalate or vinyl chloride has a drawback that it is likely electrified when used.

The leader tape of the invention with a coating material such as described above coated on its base has transmissivity enough high, so that no error operation is caused thereby.

In the above examples of the invention, a polyethylene terephthalate is used as a nonmagnetic base of a leader tape, but it will be apparent that the nonmagnetic base of the invention is not limited to the polyethylene terephthalate base only.

Further, if the coating material mentioned above may be coated on both side surfaces of a leader tape, any surface coating material is not scraped from the leader tape with the friction between the leader tape and guide pins or the like. As a result, it may be apparent that a leader tape according to the invention is employed as a leader tape for a tape used in a tape cassette with good effects.

It may be also apparent that if tin oxide including an imputity of antimony is used as a light color pigment of the coating material, a leader tape suitable for the purpose of the invention can be obtained because the leader tape thus obtained is increased in electric conductivity and high in antistatic effect.

It will be evident that many modifications and variations can be effected without departing from the scope of the novel concepts of the invention.

We claim as our invention:

1. In a combination of a magnetic recording tape for operation from reel to reel under tension and at high lineal velocity in cooperation with a magnetic recording and/or playback head and a flexible leader tape having a nonmagnetic light-transmissive base, the improvement comprising an abrasion resistant coating layer formed on the nonmagnetic base, the coating layer consisting of a binder of 100 parts by weight and a pigment of 50 to 400 parts by weight, in which the pigment and the coating formed therewith has a light color, the surface resistivity of the coating layer being less than $10^{12}$ ohms/sq. and the transmissivity of the coated leader tape being 20% or greater, said pigment including one or two of materials selected from zinc oxide, titanium oxide, calcium carbonate, zinc sulfide, silicon monoxide, antimony oxide, white lead, aluminum oxide, barium sulfate, lead sulfate, talc, clay, lithopone, and white carbon black.

2. A leader tape as claimed in claim 1, in which amount of the pigment is selected 100 to 300 parts by weight.

3. A leader tape as claimed in claim 1, in which the nonmagnetic base has coating layers on its both side surfaces.

4. A leader tape as claimed in claim 1, in which the nonmagnetic base is made of polyethylene terephthalate.

5. A leader tape as claimed in claim 1, in which the binder contains an antistatic agent.

* * * * *